United States Patent [19]
Spinelli et al.

[11] 4,445,774
[45] May 1, 1984

[54] DOCUMENT IMAGING SYSTEM WITH IMPROVED EXPOSURE UNIFORMITY AT IMAGE PLANE

[75] Inventors: Richard A. Spinelli, Rochester; Edwin F. Glab, Fairport, both of N.Y.

[73] Assignee: Xerox Corporation, Stamford, Conn.

[21] Appl. No.: 373,463

[22] Filed: Apr. 30, 1982

[51] Int. Cl.³ .............................................. G03B 27/72
[52] U.S. Cl. ...................................... 355/71; 350/450; 354/296
[58] Field of Search ......................... 355/67, 71, 8, 70; 354/296; 350/450, 432, 449, 475

[56] References Cited

U.S. PATENT DOCUMENTS

| | | | |
|---|---|---|---|
| 3,097,255 | 7/1963 | Farquhar et al. | 350/440 |
| 3,504,960 | 10/1966 | Harper | 350/450 |
| 3,669,538 | 8/1970 | Fowler | 355/67 |
| 3,777,135 | 12/1973 | Rees | 355/70 X |
| 4,229,097 | 10/1980 | Vulmiere et al. | 355/71 X |
| 4,298,274 | 11/1981 | Rees et al. | 355/71 |

OTHER PUBLICATIONS

"Lenses in Photography", Rudolph Kingslake, Garden City Books (1951), pp. 100, 101.

*Primary Examiner*—Richard A. Wintercorn

[57] ABSTRACT

The invention discloses the use of a corrector element placed in an imaging system to selectively vignette energy emanating from the exit pupil of a lens as a function of the field angle of the lens. Several imaging systems are disclosed which illustrate the technique used in determining optimum design and location of the corrector elements.

6 Claims, 12 Drawing Figures

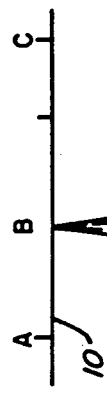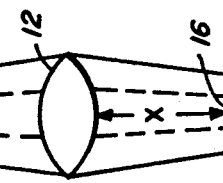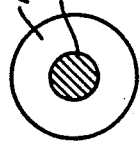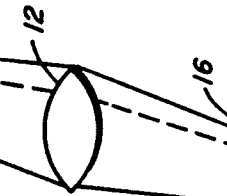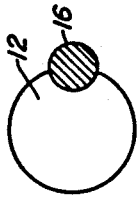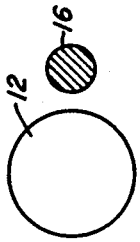

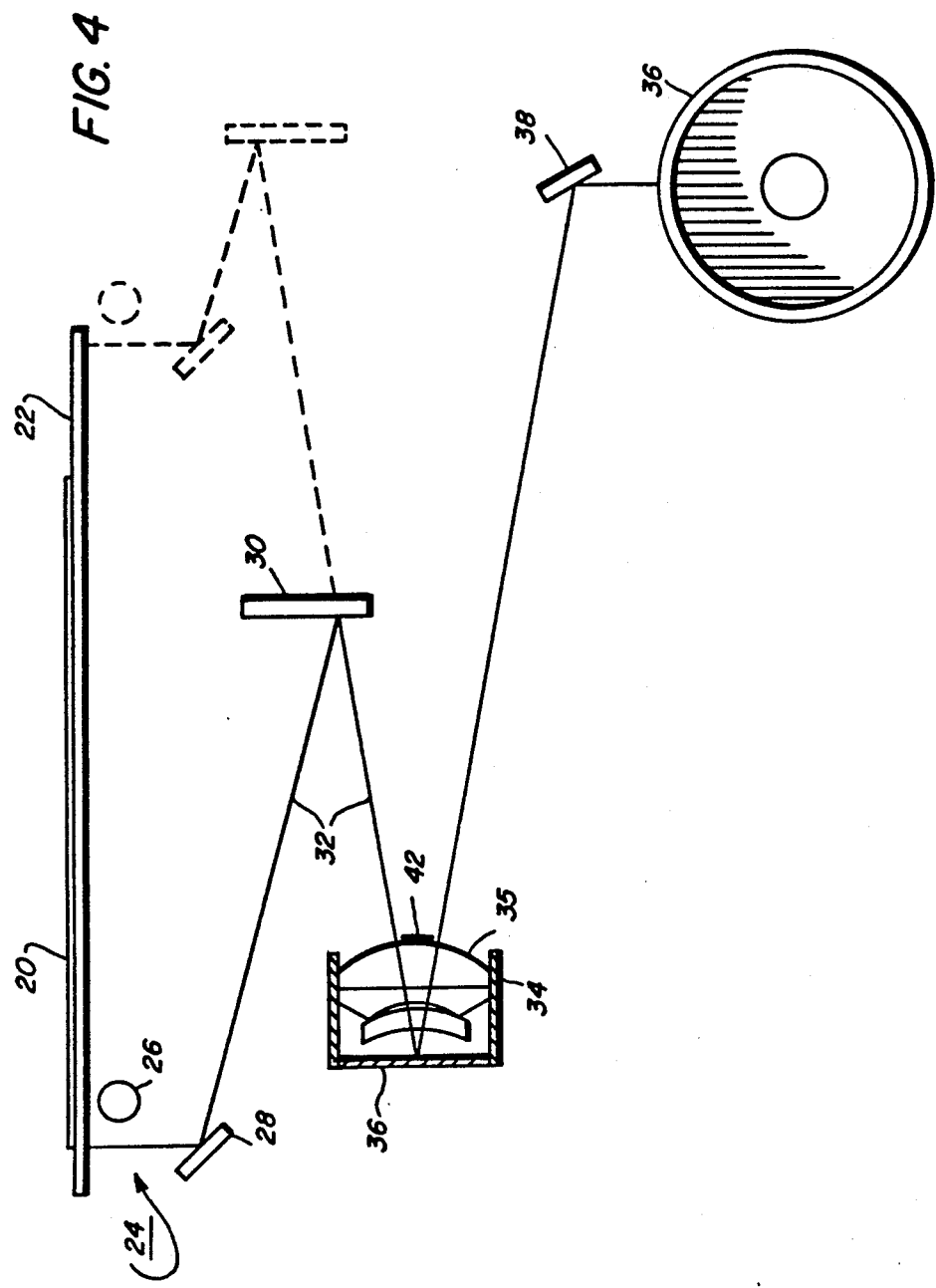

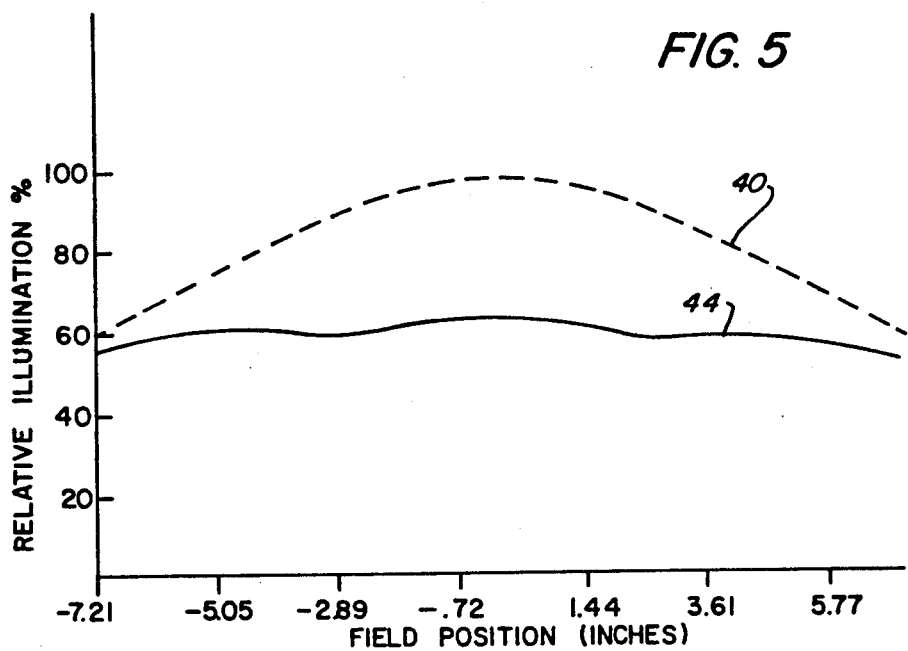
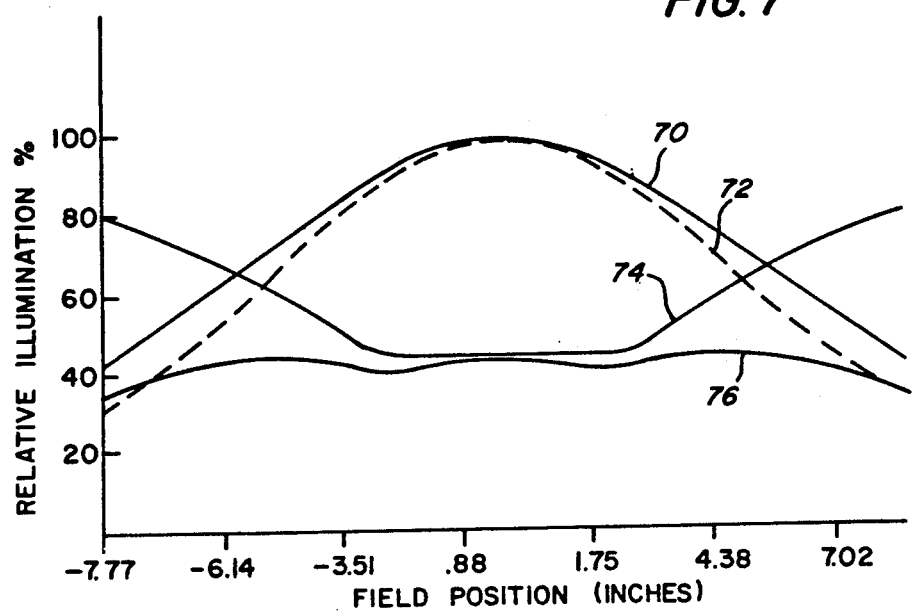

DOCUMENT IMAGING SYSTEM WITH IMPROVED EXPOSURE UNIFORMITY AT IMAGE PLANE

BACKGROUND AND PRIOR ART STATEMENT

This invention relates generally to a system for projecting an image of a document lying in an object plane onto a photosensitive image plane and, more particularly, to an improved system adapted to correct for $\cos^4$ illumination falloff and other illumination nonuniformities so as to provide a uniform illumination exposure level at the image plane.

In imaging systems such as those utilized in photocopiers, a document supported on a transparent surface is scanned by an illumination scan assembly, or is flash illuminated, and the document image is projected through a lens onto the charged surface of a photoreceptor. Those areas of the photoreceptor which are irradiated by the projected image are discharged, the degree of discharge being dependent upon the intensity of the impinging light rays. It is important that the exposure irradiance at the photoreceptor vary only due to the reflectance characteristics of the original document being copied rather than due to changes introduced by the imaging components. Stated in another manner, the optimum system would be one providing uniform photoreceptor irradiance given a uniformly reflecting documents.

Of the factors affecting relative illumination at an image plane, the most well known is the cosine (cos) variation caused by the projection lens wherein the illuminaton at the image plane is proportional to the $\cos^4$ of the angle between the optical axis and the field beam. (A discussion of this phenomenon is provided in Rudolf Kingslake's "Lenses in Photography, pp. 100, 101 (Garden City Books 1951). In a photocopier, phtoreceptor irradiance decreases as radial distance from the system optical axis increases. Various approaches have been devised to compensate for this effect. Typically, in slit-scanning systems, a sheet of opaque material having a butterfly slit formed thereon is placed in the optical path near the object or image plane acting as a field stop. The area of the slit is inversely proportional to the illumination profile. Other similar techniques employ masks having slits of this nature integral with the lens. Still other scanning systems place a variable density filter in the optical path, the transmissiveness of the filter varying inversely to the $\cos^4$.

It is also known to use optical stops in photographic systems to reduce oblique spherical aberrations. A system employing a sagittal stop is disclosed in U.S. Pat. No. 3,504,960. This type of stop is characterized by having borders of various configurations surrounding a central clear aperture. These stops are not, however, concerned with, and are not substitutes for, $\cos^4$ nonuniformity compensation.

In full frame imaging systems wherein an entire document is typically illuminated by flask illumination, efforts to compensate for $\cos^4$ light falloff have emphasized locating light sources in such a way that the document edges are illuminated to a greater degree than central areas. Two such systems are disclosed in U.S. Pat. Nos. 3,669,538 (Fowler) and 3,777,135 (Rees). Another technique is to place a variable density filter technique into the optical path as disclosed in U.S. Pat. Nos. 3,097,255 and 4,298,274.

The above-described compensation techniques each have significant disadvantages. The variable density filters are relatively expensive and entail significant energy losses. The optical slit techniques involve energy losses and also require substantial modification of the imaging system so as to operate in more than one magnification reproduction mode. The present invention is therefore directed to an illumination corrector which is inexpensive, easily placed into the optical path and adapted to provide the required $\cos^4$ compensation throughout a magnification range.

In addition to $\cos^4$ corrections, the illumination corrector can compensate for variations of document irradiance if the variations are well defined and symmetrical with respect to field position. The blocker can also compensate for illumination variations as evident by pupil distortion which is common in wide angle lenses.

SUMMARY

The present invention is directed to an imaging system for projecting an image of a document lying in an object plane onto a photosensitive image plane, said system including:

a projection lens having a plurality of elements arranged on an optical axis;

means for illuminating said document during an exposure mode of operation and for directing images of said document along the optical axis towards the entrance pupil of said lens; and at least one opaque illumination corrector placed within the field of view of said lens, said corrector means adapted to selectively vignette energy emanating from said field of view so as to provide a uniform incidence exposure level at the image plane.

The use of the corrector element is disclosed in conjunction with three different types of lens systems and the versatility of the lens is demonstrated by placement of the lens on the outside surface of the lens, within the lens itself, or in object or image space.

DRAWINGS

FIGS. 1–3 show the vignetting effect along an image plane axis, caused by placing an opaque corrector element in the image space of an imaging system.

FIG. 4 is a schematic of a first document scanning system wherein the corrector element is located on the surface of the projection lens.

FIG. 5 is a graph plotting the corrected and uncorrected relative illumination levels of the FIG. 4 system along the image plane.

FIG. 7 is a graph plotting the corrected and uncorrected relative illumination levels of the FIG. 6 system along the image plane.

DESCRIPTION

Figure 6:
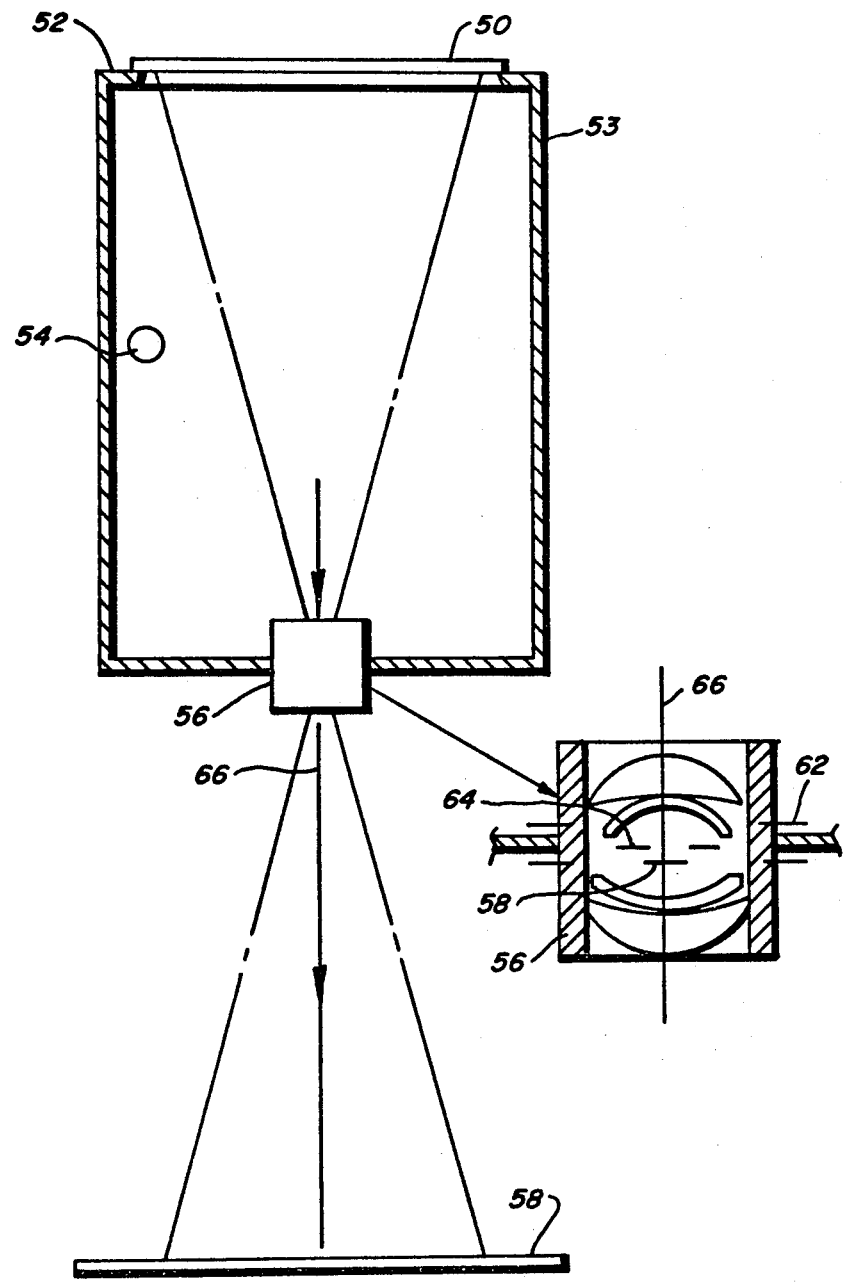
FIG. 6 is a schematic drawing of a full frame flash document imaging system wherein the corrector element is located within the lens.

The general principle of the invention is demonstrated by placing an opaque corrector in the imaging system shown in FIGS. 1a, 2a and 3a examining the resulting image plane vignetting effects.

Referring to FIG. 1a, there is shown an object plane 10, a projection lens 12 and a photosensitive image plane 14. The field of view of lens 12 extends from point A to point C with point B being the center axial point. A circular opaque corrector member 16 is placed along the optical axis of the lens at a distance X from the exit pupil of the lens. This corrector will prevent light reflected from the object plane from reaching the image plane to a varying degree, depending on the position of the object point. Using techniques described below, it is assumed that the corrector 16 has been chosen to have a geometry and location such that the reduction in energy reaching image points from the axis (point B) to the full field defined by points A and C will vary from the full vignetting on axis shown in FIG. 1a to the partial vignetting shown in FIG. 2a for a point D intermediate B and C to zero vignetting at full field (point C) shown in FIG. 3a. FIGS. 1b, 2b and 3b further clarify the blocking effect by projecting the corrector profile onto the exit pupil of the lens from a point of view at the image plane.

It can be seen that, depending on the shape (geometry) of corrector 16, its position in the optical path, and the distance from the lens exit pupil, the level of illumination reaching the image plane 14 can be selectively varied. Since the main object is to compensate for the effects of $\cos^4$ illumination falloff at the edges of the lens, the corrector will be designed to correct for these and any other non-uniformities in image plane irradiance introduced by the lens so that a uniform level of irradiance falls on the imaging plane.

Turning now to FIG. 4, there is shown a document scanning system utilizing a specific projection lens. Referring to FIG. 4, a document 20 lying on platen 22 is scanned by scanning assembly 24 consisting of an elongated apertured lamp 26 and mirror 28. As assembly 24 moves from left to right in a horizontal path below the platen, mirror 30 is moving at half the velocity of mirror 28 in order to maintain proper object-to-lens conjugate. The incrementally scanned images, represented by a principal ray, are reflected along optical path 32 into half-lens 34. Lens 34 is an f/5 lens having a focal length of 7.5 inches and a semi-field angle of 25.74 inches. The reflected images enter one face 35 of the lens and are reflected from the mirrored rear surface 36 of the lens which lies in the same plane as the exit pupil of the lens. The image reflected from surface 36 emerges from the lens entrance face 35 and is projected onto a photoreceptor drum 36 via mirror 38.

In the absence of any compensation techniques, the $\cos^4$ drop off in illumination through lens 34 results in the relative illumination level at the photoreceptor drum 36 surface depicted by plot 40 in FIG. 5. The uncorrected uniformity Vc at the image plane is given by the expression:

$$Vc = \frac{H_{MAX} - H_{MIN}}{H_{MAX} + H_{MIN}} \quad (1)$$

where H is the relative illumination level.

$$Vc = \frac{100 - 60}{100 + 60} = \pm 25\%$$

To compensate for this non-uniformity, a number of blockers having various geometries were inserted into the optical path 32, of FIG. 4. One corrector 42 was located on entrance face 35 of lens 34 a distance of 1.652 inches from the exit pupil of the lens. The corrector was an opaque circle of 20 mm diameter having its center on the bisector of the optical axis. The relative illumination level at the photoreceptor surface is shown by plot 44 in FIG. 5. While the total illumination level has decreased, the uniformity has markedly improved. Using equation (1), the uniformity is now $\pm 8.3\%$.

The following table provides data on 5 additional corrector geometries used with the optical configuration shown in FIG. 4.

| Corrector Geometry | Distance From Lens Exit Pupil | Uniformity (Vc) At Photoreceptor |
|---|---|---|
| A square 17.6 mm × 17.6 mm | 1.652 | ±9.2% |
| A square 20 mm × 20 mm | 1.652 | ±4.5% |
| A square 19 mm × 19 mm | 1.652 | ±5.3% |
|  ≈ 19 × 19 | 1.652 | ±4.8% |
|  ≈ 27 × 21 | 1.652 | ±3.0% |

As seen from the table, various corrector geometries are possible. The optimum geometry for this particular system is the last one resembling an ax blade. It was found, during testing, that the relative illumination level was also affected by pupil distortion introduced by lens 34. Expected response for a particular corrector geometry can be evaluated by setting up a computer program which calculates and correlates the lens characteristics, corrector geometry and image plane irradiance. The final actual test results correspond very closely with computer predicted results.

A second embodiment utilizing the principles of the invention is shown in FIG. 6. This figure shows a schematic of a full-frame flash exposure system where a document 50, lying on a transparent upper surface 52 of a light housing 53 is exposed by an elongated flash light source 54. The document image is projected by lens 56 onto a flat photoreceptor surface 58. Lens 56, shown in an exploded view, is a 4-element f/10 lens having a focal length of 6.09' and a semi field angle size of 36. For this type of lens, the corrector 58 was required to be placed within the lens itself.

The corrector consists of a circular opaque disc of 0.44 inch diameter. The corrector is located 0.35 inch from exit pupil 62 of the lens and on the image side of stop 64 and centered on the lens axis 66.

FIG. 7 provides several relative illumination plots which provide greater insights into the compensated and uncompensated conditions for the FIG. 6 embodiment. Referring to FIG. 7, plot 70 shows the relative illumination at the image plane considering the effects of $\cos^4$ dropoff alone. Plot 72 shows the combined effects of $\cos^4$ and lens 56 pupil distortion. Plot 74 shows the effects on illumination by introducing the corrector 58. Plot 76 is then the resultant scan of plots 74 and 72 and shows the final uniformity level at photoreceptor 58 surface. For this case, the uncorrected uniformity Vv is $\pm 52\%$ and the corrected uniformity is $\pm 12.5\%$.

Figure 8:
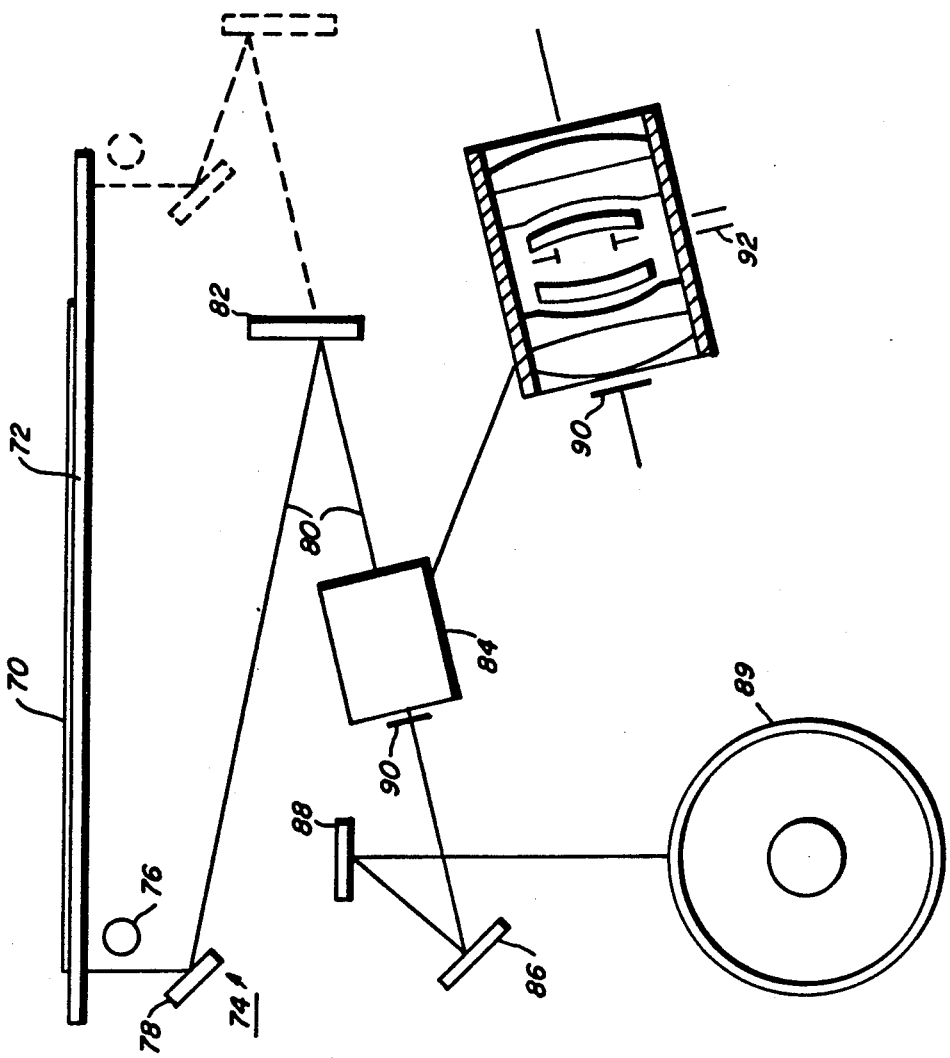
FIG. 8 is a schematic drawing of a second document scanning system where the corrector element is loaded in the image space side of the lens.

FIG. 8 shows a third embodiment of an imaging system wherein the corrector element required is placed in image space. In this embodiment, document 70 is placed on transparent platen 72. Assembly 74, consisting of apertured lamp 76 and full-rate mirror 78 moves in a horizontal path beneath the platen to incrementally illuminate portions of the document. The light rays reflected from the document are reflected by mirror 78 along optical path 80 to half-rate mirror 82. Mirror 82 reflects the light rays through lens 84 onto mirrors 86 and 88 and then onto the surface of photoreceptor drum 89. Corrector element 90 has been positioned along the optical axis on the image side of the lens. As shown in the enlarged view of the lens, corrector 90 is a 0.64" diameter circle located 0.64" from the exit pupil 92 of the lens.

Figure 9:
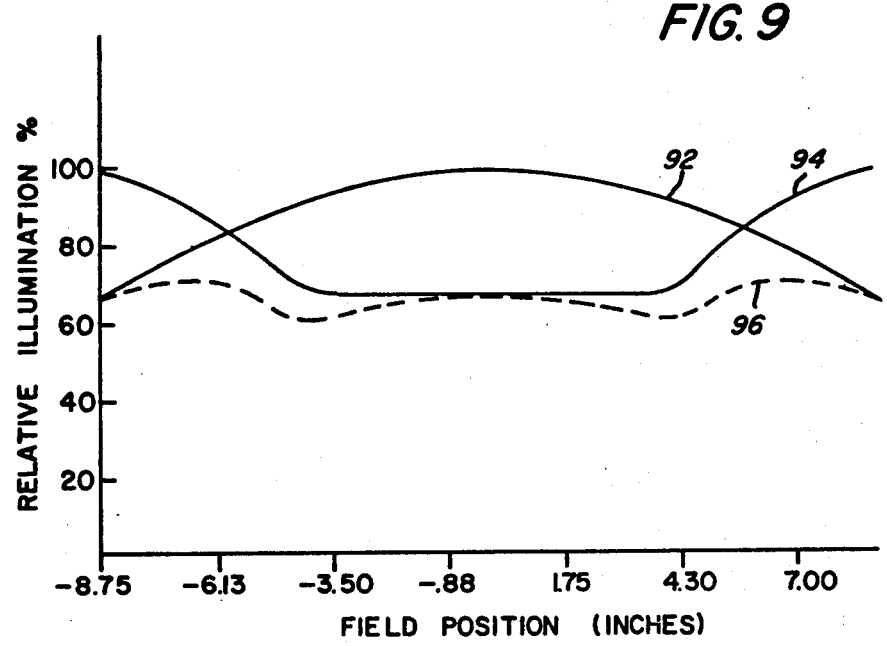
FIG. 9 is a graph plotting the corrected and uncorrected relative illumination levels of the FIG. 8 system along the image plane.

FIG. 9 shows the relative illumination level at the photoreceptor surface for the uncorrected case (plot 92), the effects of adding corrector 90 (plot 94) and the resultant corrected profile (plot 96). For this embodiment, the uncompensated level Vc is 18.3% and the compensated Vc 7.4%.

To summarize the above, an opaque corrector member of appropriate design can be placed in the optical path of an imaging system for the purpose of compensating for $\cos^4$ and lens pupil distortion so as to provide a more uniform illumination level at an imging plane. The corrector can be placed on the surface of the projection lens (FIG. 4 embodiment); within the lens (FIG. 6 embodiment) or in object or image space (FIG. 8 embodiment). The invention utilizes the principle of selective obscuration of energy emanating from the pupil of a lens (or impinging on the entrance pupil) as a function of the lens field angle. The corrector should be radially symmetrical for a lens used in a flash system (FIG. 6) but need not be so for a scanning system (FIGS. 4 and 8).

Other variations to the embodiments described above are possible consistent with the principles of the invention. For example, the corrector need not be located on the axis in the scanning system. Further, the corrector could consist of two or more segments located at the same or different axial positions, their total vignetting effect providing the required obscuration. The axial location of the corrector could also be variable as a formation of registration changes.

What is claimed is:

1. An imaging system for projecting an image of a document lying in an object plane onto a photosensitive image plane, said system including:
   a projection lens;
   means for illuminating said document during an exposure mode of operation and for directing images of said document along an optical axis towards the entrance pupil of said lens; and
   at least one uniformly opaque illumination corrector positioned between said object and image planes and within the field of view of said lens, said corrector adapted to selectively vignette energy emanating from said field of view so as to provide a uniform exposure level at the image plane.

2. The imaging system of claim 1 wherein the corrector is centrally located along said optical axis.

3. The imaging system of claim 1 or 2 wherein the corrector is placed on the image side of said lens.

4. The imaging system of claim 1 or 2 wherein the corrector is placed in a plane within the lens.

5. The imaging system of claim 1 or 2 wherein the corrector is located on the outer surface of said lens.

6. The imaging system of claim 1 or 2 wherein the corrector has a radially symmetrical configuration.

* * * * *